USOO5569868A

United States Patent [19]

Leung

[11] Patent Number: 5,569,868
[45] Date of Patent: Oct. 29, 1996

[54] SOUND GENERATING BOOK

[75] Inventor: Chun S. Leung, Tsuen Wan, Hong Kong

[73] Assignee: Tiger Electronics, Inc., Vernon Hills, Ill.

[21] Appl. No.: 294,965

[22] Filed: Aug. 24, 1994

[51] Int. Cl.⁶ .............................. G09B 5/00; G10H 1/00; G10H 5/00
[52] U.S. Cl. ........................ 84/600; 434/169; 446/397
[58] Field of Search .................. 84/600, 471 R, 84/483.1, 483.2; 40/124.1, 455; 446/397; 206/232

[56] References Cited

U.S. PATENT DOCUMENTS

| | | | |
|---|---|---|---|
| 3,729,837 | 5/1973 | Tarnopolsky et al. | 35/9 R |
| 3,795,989 | 3/1974 | Greenberg et al. | 35/9 B |
| 3,798,806 | 3/1974 | Sanford | 40/124.1 |
| 4,288,537 | 9/1981 | Knetzger | 434/169 |
| 4,403,965 | 9/1983 | Hawkins | 434/327 |
| 4,752,230 | 6/1988 | Shimizu | 434/317 |
| 4,778,391 | 10/1988 | Weiner. | |
| 4,990,092 | 2/1991 | Cummings | 40/455 X |
| 5,087,043 | 2/1992 | Billings et al. | 273/157 R |
| 5,088,928 | 2/1992 | Chan | 434/339 |
| 5,127,869 | 7/1993 | Hanzawa | 446/397 |
| 5,161,977 | 11/1992 | Thomas, Jr. | 434/322 |
| 5,188,533 | 2/1993 | Wood | 434/169 |
| 5,209,665 | 5/1993 | Billings et al. | 434/169 |
| 5,275,285 | 1/1994 | Clegg | 40/455 X |

OTHER PUBLICATIONS

The My Talking Storybook Library, Copyright 1990 Golden Sound Story, The Walt Disney Company, 1991.

*Primary Examiner*—Stanley J. Witkowski
*Attorney, Agent, or Firm*—Fitch, Even, Tabin & Flannery

[57] ABSTRACT

A plurality of sensors, including transmitters and receivers, are positioned at various sections of a book for triggering sound generation. In an embodiment of the invention the sensor is a capacitive sensor wherein the transmitter and receiver are capacitive plates allowing electrical signals to be capacitively coupled therebetween when the book pages are in a closed position. The strobing or scanning of the plurality of sensors allows the book, under computer control, to determine the page to which the book is opened and accordingly trigger particularized sounds relating to the appropriate talking section.

23 Claims, 4 Drawing Sheets

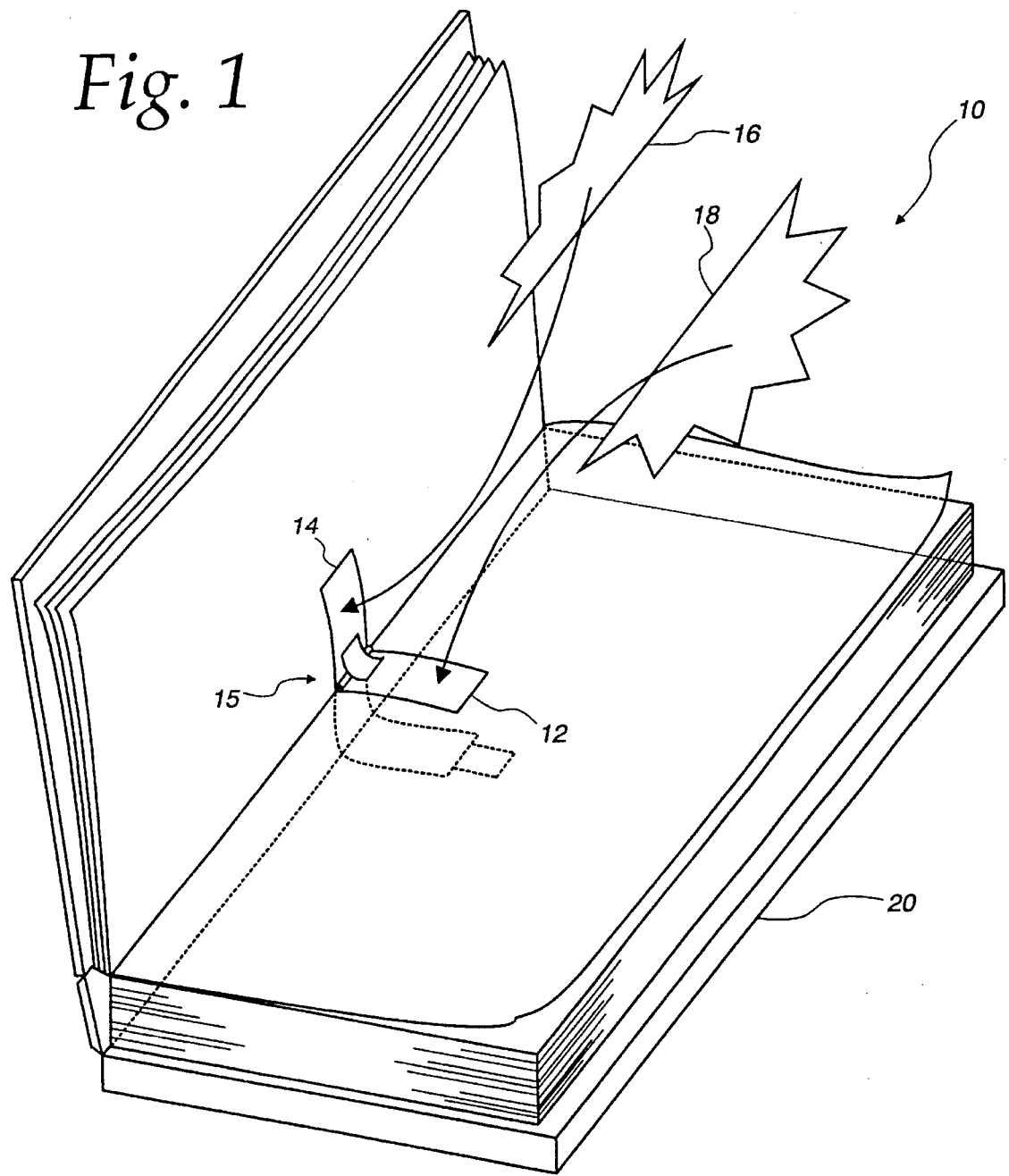

SOUND GENERATING BOOK

BACKGROUND OF THE INVENTION

1. Field of the Invention

The present invention relates to sound generating and talking books, catalogues and the like where audible speech and melodic sounds are associated with sections of written textual materials. More particularly, the invention relates to the automatic activation of such sounds when the reader of the materials reads the associated sections without requiring the reader to activate the sounds.

2. Description of the Prior Art

With the advent of electronically synthesized speech and music which today may be provided inexpensively with integrated circuits often referred to as voice chips, such circuits are presently being provided in many novelty and toy devices. A number of talking books and even musical and/or talking greeting cards are available. The triggering mechanism of these items, however, requires the user to press a button in order to hear the speech or music. The triggering mechanism cannot discern among multiple pages but rather relies upon proper user selection of the buttons for triggering the sounds.

Accordingly, widely available books and the like which utilize sound generation require some form of manual intervention to activate the sounds. As such, the required activation, in addition to turning pages and reading a book, is distracting to the user. Thus, it would be desirable to provide a talking book or sound generating book in which the turning of pages alone provides activation of generated sounds.

SUMMARY OF THE INVENTION

It is an object of the present invention to overcome the triggering problems of prior art sound generating books, cards, catalogues and the like.

It is an object of the invention to provide a sensor which may be disposed upon various pages of a book for sensing the opening and closing of pages.

Another object of the present invention is to provide a book having particularized stored sounds for generation upon the opening of particular pages during the use of the book.

Another object of the invention is to provide a method of detecting the opening of particular pages within a book and concealing the triggering of sound generation so as to make operation of the sound generating book transparent to the user.

Briefly, the present invention relates to a sound generating book in which various talking sections are provided such that the opening of particular pages within the book triggers sound generation which may include voice and melodic signals. A plurality of sensors, including transmitters and receivers, are positioned at various sections of the book for triggering sound generation. In an embodiment of the invention the sensor is a capacitive sensor wherein the transmitter and receiver are capacitive plates allowing electrical signals to be capacitively coupled therebetween when the pages are in a closed position. The strobing or scanning of the plurality of sensors allows the book, under computer control, to determine the page to which the book is opened and accordingly trigger particularized sounds relating to the appropriate talking section.

BRIEF DESCRIPTION OF THE DRAWINGS

FIG. 1 is a perspective view of a talking book in accordance with the present invention;

DETAILED DESCRIPTION OF THE PREFERRED EMBODIMENT

Figure 2A:
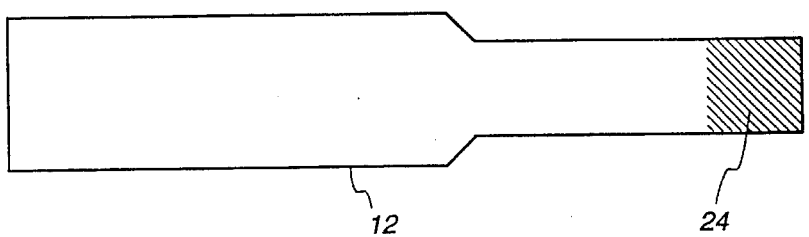
FIGS. 2A, 2B, 2C and 2D illustrate the construction of a sensor for detecting the opening of pages of the book of FIG. 1.
Figure 2B:
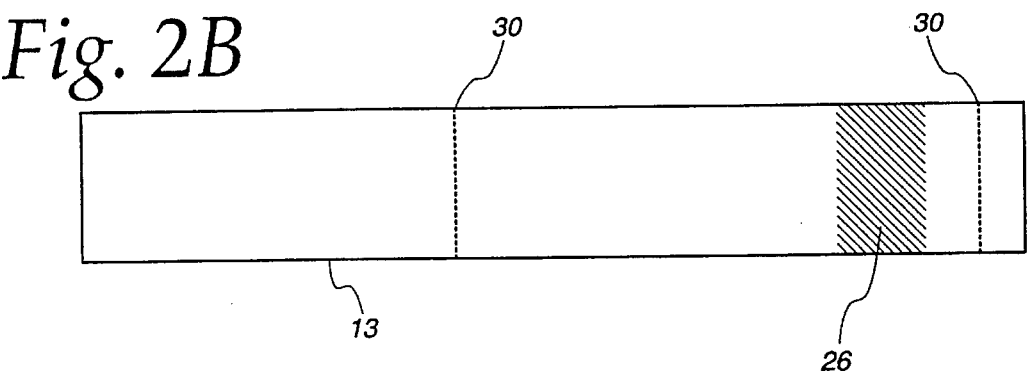
Figure 2C:
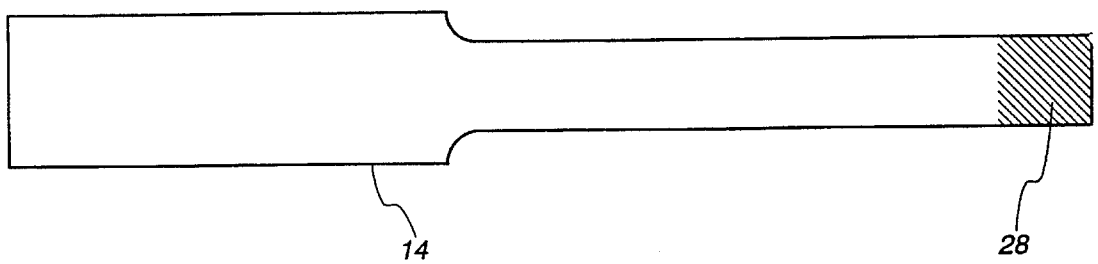

As depicted in FIG. 1, a book 10 for generating audible sounds including voices and melodic signals includes a transmitter 12 and a receiver 14 both disposed on opposing pages of the book 10 as a sensor assembly generally shown at reference numeral 15. A pair of labels 16 and 18 are positionable over the transmitter 12 and receiver 14 of the sensor assembly 15 to conceal the presence of the sensor assembly 15 on the pages of the book 10. The label pair 16 and 18 may be a graphic label to both cover the sensor assembly 15 and blend with the indicia on the pages of the book 10. A book cover/electronics housing, housing 20, is provided to enclose the electronic circuitry and speaker associated with the generation of various sounds.

Figure 2D:
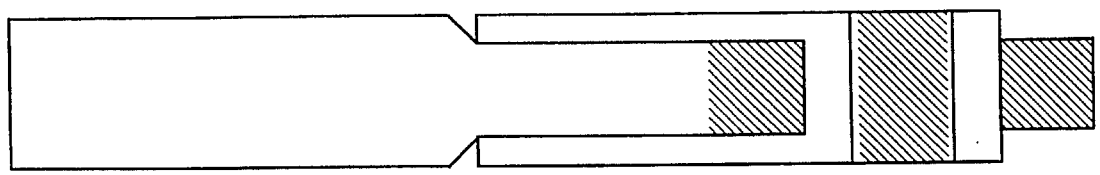

FIGS. 2A–2D illustrate the construction of the sensor assembly 15 for detecting the opening of pages of the book 10. The sensor assembly 15 includes the transmitter 12 shown in FIG. 2A and the receiver 14 shown in FIG. 2D. Disposed between the transmitter 12 and the receiver 14 is a ground shield 13. The transmitter 12, ground shield 13 and receiver 14 may be constructed from paper backed conductive foil, such as aluminum foil, which is adhered to paper. The transmitter 12, ground shield 13 and receiver 14 are each provided with an electrical contacting area, fold lines 30 shown as dash lines are provided on the ground shield 13 of FIG. 2B so the ground shield 13 may be folded and placed between the transmitter 12 and receiver 14 as shown in FIG. 2D which illustrates the construction of the sensor assembly 15.

Whereas the triggering mechanisms of the prior art require the user to press a button in order to hear the speech and sounds, the triggering mechanism described herein avoids physical and deliberate triggering by the user and hides the sensor assembly 15. To better discern signals capacitively coupled through the sensor assembly 15, it is desirable to make the transmitter 12 and receiver 14 as large as possible. However, since it will usually be desired to cover up the sensor assembly 15 so that the user will not be aware of its presence, the pair of labels 16 and 18 may be provided as graphic labels to make pages of the book look natural. Of course, it is desirable at the same time to keep the size of the pair of labels 16 and 18 minimized so as to conceal the sensor assembly 15 from the user.

In the described and preferred embodiment, the wide areas of the transmitter 12 and the receiver 14 are provided as having dimensions 1 centimeter by 3 centimeters and thus having an area of 3 cm$^2$. With these dimensions, a 5-volt D.C. 10 kilohertz square wave input signal to the transmitter 12 provides an output signal of 2 volts peak-to-peak when the book is closed; 0.4 volts peak-to-peak when book pages are open 30 degrees; and 0.2 volts peak-to-peak at 45 degrees or greater. The voltage ranges were determined to be adequate to discern between pages which are closed and those which are open. Since the capacitive coupling of electrical signals between the transmitter 12 and the receiver 14 is sensitive, the ground shield 13 provides considerable immunity to noise and bypasses all such extraneous signals to ground which prevents misinterpreting the scanning of the sensor assemblies 15.

Examples wherein the sensor assembly 15 has other dimensions include the following. A 2 cm.$^2$ area produced by the dimensions 2 centimeters by 1 centimeter produces an output signal of 1.4 volts peak-to-peak when the book is closed; 0.3 volts peak-to-peak at 30 degrees; and 0.2 volts peak-to-peak at 45 degrees or greater. With an area of 1 cm.$^2$, dimensions 1 centimeter by 1 centimeter, the output signals generated are 1 volt peak-to-peak with the book closed; 0.25 volts peak-to-peak at 30 degrees; and 0.2 volts peak-to-peak at 45 degrees or greater. An area of 9 cm.$^3$, 3 centimeters by 3 centimeters, provides 3 volts peak-to-peak when the book is closed; 0.6 volts peak-to-peak at 30 degrees; and 0.32 volts peak-to-peak at 45 degrees or greater. An area of 6 cm.$^2$, 3 centimeters by 2 centimeters, provides 2.5 volts peak-to-peak when the book is closed; 0.5 volts peak-to-peak at 30 degrees; and 0.3 volts peak-to-peak at 45 degrees or greater.

Figure 3:
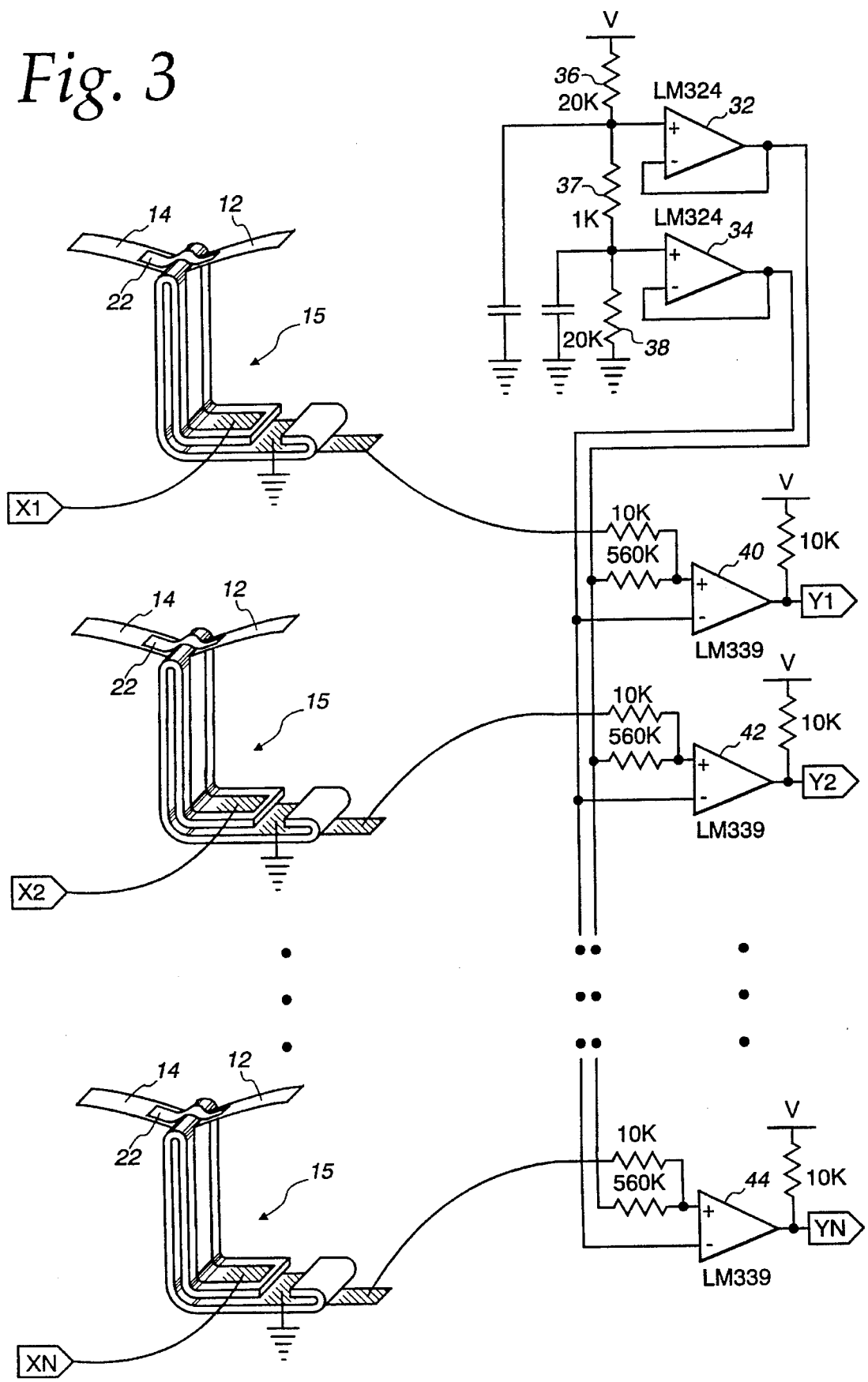
FIG. 3 shows several sensors used in transmitting and receiving circuitry for triggering sound generation in accordance with the invention.

Turning now to FIG. 3, three exemplary sensor assemblies 15 are illustrated, however it should be understood that several such sensor assemblies 15 are employed in various talking sections of the book 10 and in one embodiment seventeen (N=17) such sensor assemblies 15 have been used. Input signals are provided to the various transmitters 12 via connections at X1, X2, ... XN, and output signals are taken from the various receivers 14 at comparators 40, 42 and 44 which are LM 339 comparators for discerning between the open and closed positions of respective pages having a sensor assembly 15. Output signals are taken from the respective comparators 40, 42 and 44 and provided as outputs Y1, Y2, ... YN.

The electronics of FIG. 3 and FIG. 4 discussed below are enclosed in the housing 20 of the book 10. The transmitting and receiving ends of the transmitter 12 and receiver 14 are bonded together via a positioning label 22 as shown in FIG. 3, the sensor assemblies 15 are wrapped around the spine of book 10 and lead into the housing 20. The various sensor assemblies 15 are evenly spaced throughout the spine of the book 10 so as to avoid uneven thickness in stacking.

A buffered voltage divider network is provided for use with the comparators 40, 42 and 44. A voltage, V, on the order of 5 to 6 volts, is divided via resistors 36, 37 and 38 which in one embodiment are resistors having values of 20 kiloohms, 1 kiloohm and 20 kiloohms, respectively. Any appropriate divider network will suffice. Operational amplifiers 32 and 34 herein LM 324 op amps are figured as unity gain buffers whose outputs are presented to the inputs of the comparators 40, 42 and 44 for comparing the output of a sensor assembly 15 to discern the positioning of the pages of the book 10.

Figure 4:
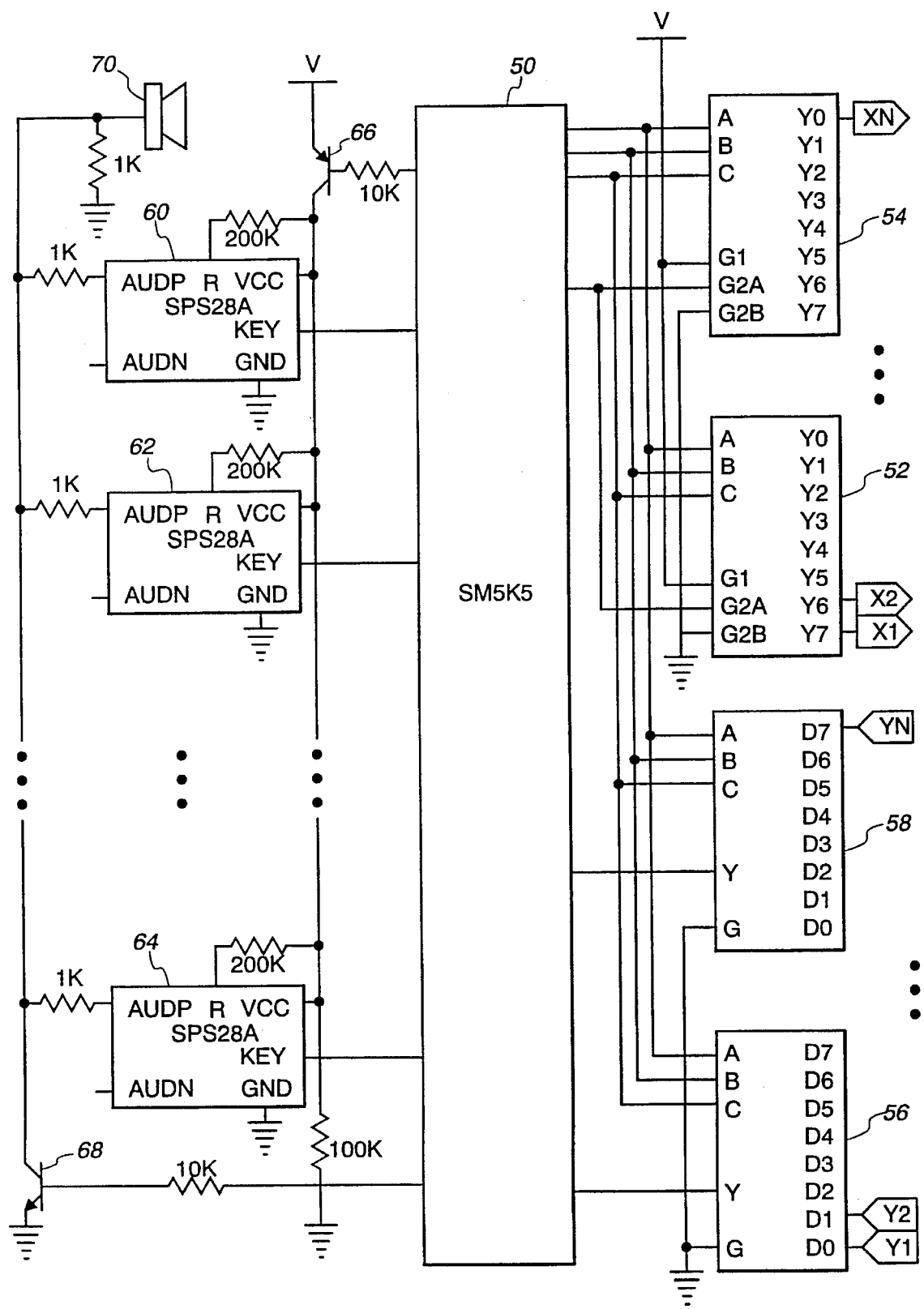
FIG. 4 shows computer control circuitry including several voice chips for generating sounds for the talking book of FIG. 1.

FIG. 4 shows a schematic diagram of a computer base circuit for operating the book 10. A computer 50 herein is provided as the SHARP Co. single chip microcomputer model SM5K5 which is a single chip, 4 bit microcomputer. Of course, any appropriate microcomputer or microprocessor could be employed as computer 50. The output signals X1, X2, ... XN are provided at the outputs of demultiplexers 52 and 54 which are three to eight decode/demux 74HC138 devices. Inputs from Y1, Y2, ... YN are received via multiplexers 56 and 58 which are one of eight selectors/multiplexers 74HC151 devices. The demultiplexers 52 and 54 and multiplexers 56 and 58 are interfaced via ports of the computer 50.

FIG. 4 also shows several voice chips 60, 62 and 64 which are SUNPLUS Technology Co., Ltd. SPS28A speech synthesizer circuits which provide 28 seconds of synthesized speech or music. The SPS28A is a PCM speech synthesizer providing 32 speech sections. Sound is triggered from the voice chips 60, 62 and 64 under the control of the computer 50 via a key or trigger input on the voice chips which are connected to ports of the computer 50. Enabling and disabling of the voice chips 60, 62 and 64 may be switched via a transistor 66 under the control of the computer 50 to switch the voltage to the voice chips 60, 62 and 64 and to activate or deactivate the R input of the voice chips 60, 62 and 64 which will serve to enable and disable sound generation by the book 10.

Although three voice chips 60, 62 and 64 are shown in FIG. 4, seven such voice chips have been employed in an embodiment for selective triggering of sound based upon the opening and closing of pages detected by the computer 50 via the transmitting and receiving of signals through sensor assemblies 15 as described above. Once a sound on a particular one of the voice chips 60, 62 or 64 is selected by the computer 50, an electrical signal is sent to a speaker 70 for generating sound thereby. A switching transistor 68 is provided to switch the connection to the speaker 70 to ground under the control of the computer 50. This allows the computer 50 to enable and disable the speaker 70.

In operation, the computer 50 scans each sensor assembly 15 to detect whether a talking section of the book pages has been opened. An electrical pulse is sent to the transmitter 12, the signals X1, X2, ... XN. If the talking section relating to a particular sensor assembly 15 is closed, then the transmitter 12 and the receiver 14 are in close proximity to one another and the receiver 14 will detect a strong electrical pulse capacitively coupled from the transmitter 12. This received signal will be output via the comparators 40, 42 and 44 to the computer 50 through the multiplexing of signals Y1, Y2, ... YN. If the signal output from the sensor assembly 15 exceeds the detection threshold of the comparator, so as to indicate that the talking section under scan is not opened, the computer 50 will then scan the next talking section. Of course, if a talking section being scanned is open, then the transmitter 12 and the receiver 14 are far from one another and any signal capacitively coupled therebetween is very weak and cannot exceed the detection threshold. Thus, the computer 50 will detect the opening of the scanned talking section and play speech or melody associated therewith through one or more of the voice chips 60, 62 and 64.

Other embodiments of the book and sensor for generating and triggering sounds in accordance with the present invention will be apparent to those skilled in the art from consideration of the specification and practice of the invention disclosed herein. It is intended, therefore, that the specification be considered as exemplary only with the true scope and spirit of the invention being indicated by the following claims.

What is claimed is:

1. A book for generating sound responsive to the opening of pages therein comprising:

a front cover;

a back cover;

a plurality of pages bound between said front cover and said back cover;

a plurality of transmitter and receiver pairs disposed on at least some of the respective pairs of said plurality of pages;

said transmitters and said receivers of said pairs being movable between a page closed position and page open position;

means for receiving signals transmitted via said transmitters and received via said receivers indicative of a particular pair of pages being open; and means responsive to said receiving means for generating a sound related to the open page pair.

2. A book in accordance with claim 1 wherein said detecting means comprises a computer for transmitting a signal via said transmitter and for receiving said signal via said receiver.

3. A book in accordance with claim 2 wherein said generating means comprises a speaker and said computer generates a signal for generating sound at said speaker.

4. A book in accordance with claim 3 wherein said computer and said speaker are housed within said back cover.

5. A book in accordance with claim 4 further comprising a label pair for concealing said transmitter and said receiver on the pages on which said transmitter and said receiver are disposed.

6. A book in accordance with claim 5 wherein said transmitter and said receiver comprise capacitive plates of a capacitive sensor capable of conducting an electrical signal when said transmitter and said receiver are in a closed position.

7. A book in accordance with claim 6 comprising a plurality of transmitters and receivers disposed on said plurality of pages such that signals are received via different said receivers based upon the opening and closing of respective pages.

8. A book in accordance with claim 7 wherein said computer sequentially strobes said plurality of transmitters and receivers to detect the opening and closing of particular ones of said plurality of pages.

9. A book in accordance with claim 8 wherein said sound generating means further comprises at least one sound generating integrated circuit operable via said computer for generating the electrical signal at said speaker.

10. A book in accordance with claim 9 comprising a plurality of sound generating integrated circuits under the control of said computer for selectively activating at least one of said sound generating integrated circuits responsive to the opening of one of said plurality of pages.

11. A method of generating sound responsive to the opening of opposing pages in a book, said book having a transmitter disposed on a first page of the book and a receiver disposed on a second page adjacent said first page, said transmitter and said receiver being movable with said first page and said second page between closed and opened positions, said closed position facing said transmitter toward said receiver and said open position facing said transmitter away from said receiver, the method comprising the steps of:

transmitting a signal via said transmitter;

receiving said signal with said receiver;

detecting, responsive to said receiving step, the position of said transmitter and said receiver; and generating sound when said transmitter and said receiver are in said open position.

12. A method in accordance with claim 11 further comprising the step of concealing the provided transmitter and receiver beneath a pair of labels.

13. A method in accordance with claim 12 further comprising the step of capacitively coupling said signal via said transmitter and said receiver.

14. A method in accordance with claim 13 further comprising the step of providing a plurality of transmitters and a plurality of receivers on plural pages of the book.

15. A method in accordance with claim 14 further comprising the step of sequentially strobing each of said plurality of transmitters and plurality of receivers to determine the page to which the book is opened.

16. A method in accordance with claim 15 wherein said generating step generates particularized sounds dependent upon the page to which the book is opened.

17. A method in accordance with claim 16 wherein said generating step generates speech in the form of words and phrases.

18. A sensor assembly for detecting the opening of a page in a book comprising:

a transmitter positionable on the a first page of the book;

a receiver positionable on a second page adjacent said first page; and said transmitter and said receiver being movable between a closed position and an open position, said closed position facing said transmitter toward said receiver and said open position facing said transmitter away from said receiver generating a page closed signal when said first and said second pages are in contact with each other and a page open signal when said first and said second pages are not in contact and in the open position.

19. A sensor assembly in accordance with claim 18 wherein said transmitter and said receiver capacitively couple electrical signals therebetween when in said closed position.

20. A sensor assembly in accordance with claim 19 further comprising a pair of labels for concealing said transmitter and said receiver upon said first page and said second page of the book.

21. A book for generating sounds associated with particular pages within the book comprising a plurality of pages connected together;

a plurality of page position sensors associated with at least some of said pages, said page position sensors generating a page closed signal when successive pages are in contact with each other and a page open signal when particular pages are not in contact and in the open position;

a sound generator for generating a first sound in response to a page open signal from a first page sensor and for generating a second sound in response to a page open position from a second page sensor.

22. A sound generating book according to claim 21 wherein said page sensors comprise capacitive sensors.

23. A sound generating book according to claim 22 further comprising a second sound generator responsive to a page open signal from a third page sensor of said plurality of page sensors.

* * * * *